May 13, 1969
G. C. GUYDOS
3,443,335
ROD AND REEL HOLDER
Filed Oct. 25, 1967
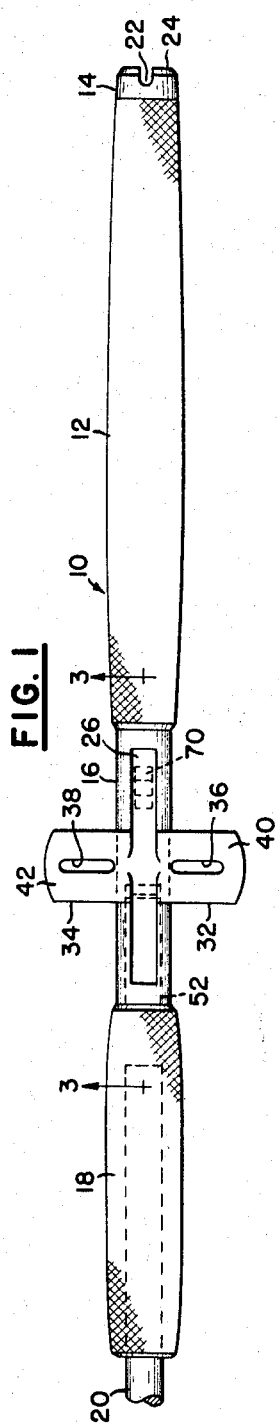
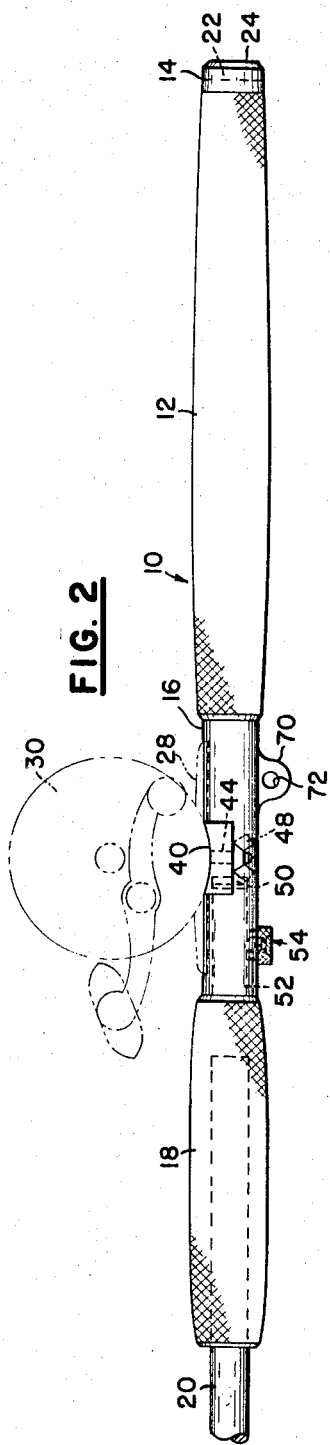
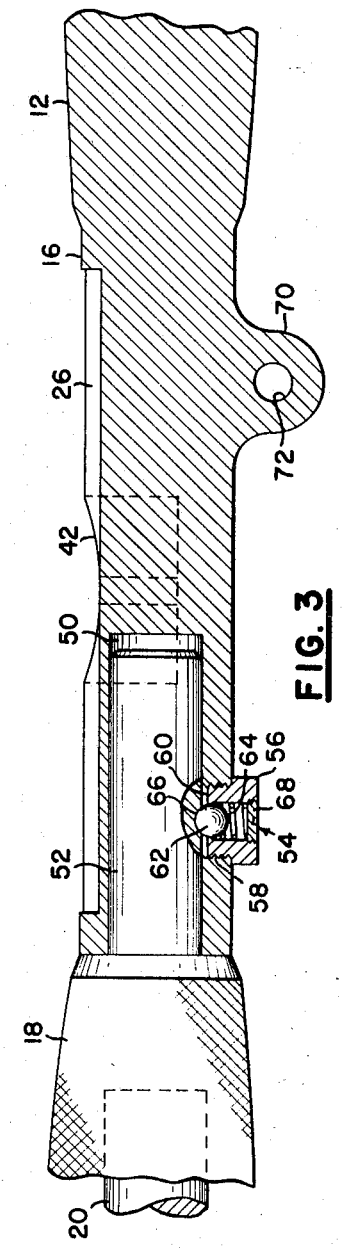
INVENTOR.
GILBERT C. GUYDOS
BY James N. Lyles
John H. Oltman
ATTORNEYS United States Patent Office 3,443,335
Patented May 13, 1969

3,443,335
ROD AND REEL HOLDER
Gilbert C. Guydos, 2637 Adams St.,
Hollywood, Fla. 33020
Filed Oct. 25, 1967, Ser. No. 678,067
Int. Cl. A01k 87/06
U.S. Cl. 43—22                                   10 Claims

ABSTRACT OF THE DISCLOSURE

The invention provides a rod and reel holder in which a handle, a gimbal butt and a real seat portion are all integral portions of a one-piece, elongated, rigid holder member which may be cast or molded from metal or plastic. The reel seat portion is cylindrical and has a depression therein for receiving the base of a reel and an axial bore for receiving a projection of a further handle. The reel seat portion further has lugs projecting transversely from opposite sides of the depression providing a seat for the reel frame, and the lugs have concave upper surfaces substantially coplanar with or above the bottom of the depression, and openings for receiving bolts of the reel. The lugs are of one-piece construction with the reel seat portion. The reel seat portion also includes retention means for engaging an indentation in the projection of the further handle and an eyelet which may receive a hook or the like for attaching the holder to a boat.

Background of the invention

Rod and reel holders of the type used in fishing for large fish which are available at the present time are made in several pieces. Usually, there is a wooden handle and a gimbal butt and a reel seat are metal parts which must be secured to the wooden handle at opposite ends thereof. The joints between these parts may be somewhat weak, and breakage often occurs at the joints. Sometimes, the wooden handle becomes rotted and then will break very easily. Also, the handle especially is subject to weathering and must be sanded and revarnished frequently. The handle can become somewhat slippery, particularly if it is gripped with a wet hand or one contaminated with fish scales, and in this case, the holder, rod and reel may go overboard. Furthermore, the provisions for attaching a reel to the reel seat have not been particularly strong and bending or breakage of these parts has been common. The labor involved in assembling the various parts together and securing them in place is a substantial cost in the manufacture of these conventional holders, and it would be desirable if such labor could be eliminated. Furthermore, the metal parts may corrode unless they are protected.

Summary of the invention

In the rod and reel holder of th present invention, a handle, a reel seat and a gimbal butt are all integral portions of a one-piece, elongated, rigid holder member which may be cast or molded from plastic or a metal such as aluminum or bronze. This eliminates joints which may be weak, and this overcomes much of the breakage problem connected with standard rod and reel holders. The gimbal butt has a recess for engaging a gimbal, and the reel seat has a depression extending longitudinally thereof for receiving the base of a reel. The reel seat has an axial bore for rceiving a projection of a separate further handle, and has a pair of lugs on opposite sides of the depression which project transversely of the holder and provide a seat for a reel. The lugs have openings receiving bolts of the reel, and the upper surfaces of the lugs are concave to match the curvature of the reel so that the reel is held very firmly in place. The reel seat also may include a retention device which in a preferred embodiment is a hollow screw communicating with the bore in the reel seat, a ball within the screw and a spring urging the ball partially through an opening at one end of the screw so that the ball can engage in an indentation in the projection of the further handle to thereby retain the further handle in place. An eyelet may be provided on the reel seat for attaching the holder to a boat. The two handles may be finely knurled to provide gripping surfaces thereon.

Accordingly, it is an object of the present invention to provide an improved rod and reel holder in which a handle, a reel seat and a gimbal butt are integral portions of an elongated, rigid, one-piece structure which may be cast or molded from metal or plastic.

Another object of the invention is to provide a one-piece holder structure having a reel seat which firmly supports a fishing reel.

Another object of the invention is to provide a reel seat of a rod and reel holder with transversely extending lugs to which a reel may be bolted, the lugs having curved surfaces conforming to the reel to provide a firm seat for the reel.

Another object of the invention is to provide a reel seat of a rod and reel holder with a retainer for holding a separate holder part in assembled relation with the reel seat.

Among the other objects of the invention are to improve the gripping features of a rod and reel holder, to provide a means of anchoring the rod and reel holder to a boat, and to provide a rod and reel holder which can be manufactured economically on a mass production basis.

Other objects of this invention will appear in the following description, reference being had to the accompanying drawings forming a part of this specification wherein like reference characters designate corresponding parts in the several views.

On the drawings:

FIGURE 1 is a plan view of a rod and reel holder in accordance with the invention;

FIGURE 2 is an elevational view of the rod and reel holder of FIGURE 1 with a fishing reel attached to the holder shown in phantom; and FIGURE 3 is a fragmentary sectional view taken along 3—3 of FIGURE 1 and showing a real seat and an adjoining separate handle.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

The rod and reel holder includes a first piece which is an elongated rigid, one-piece structure 10 including a handle 12, a gimbal butt 14 projecting from one end of the handle and a reel seat portion 16 projecting from the other end of the handle. A separate handle piece 18 is attached to reel seat portion 16, and the handle 18 may be considered as a part of the rod and reel holder although it may be furnished separately with a rod 20 secured therein as by resin adhesive material.

The one-piece structure 10 made up of handle 12, gimbal butt 14 and reel seat portion 16 is preferably made by casting aluminum or bronze, but it may alternatively be made of plastic material. The handle 12 is elongated, rigid and solid so that it is very strong. The gimbal butt 14, which is integral with the handle 12, has a recess 22 extending inwardly from the end 24 thereof, and its recess is designed to engage a gimbal normally associated with a fishing boat. A reel seat portion 16, which is integral with the other end of handle 12, has a depression 26 therein which extends longitudinally of one-piece structure 10 and serves to receive a reel base 28 of a reel 30 in the manner shown in FIGURE 2.

Reel seat portion 16 also includes a pair of lugs 32 and 34 which are integral with the remaining material of the reel seat portion 16, and which project transversely from opposite sides of the reel seat and adjoin the depression 26. The lugs 32 and 34 have elongated openings 36 and 38 therein which extend from the upper surfaces 40 and 42 of the lugs to opposed lower surfaces of the lugs. The reel 30 has bolts 44 (FIGURE 2) which extend through the openings 36 and 38 and which are fastened to the lugs by wing nuts 48 as shown in FIGURE 2. The upper surfaces 40 and 42 of the lugs 32 and 34 are concave in the longitudinal direction of the holder as shown in FIGURES 2 and 3 so as to match the curvature of the reel 30 and thus provide firm engagement between reel 30 and lugs 32 and 34. With reel base 28 seated in depression 26 and reel 30 seated on curved surfaces 40 and 42 of lugs 32 and 34, the reel 30 is very stable and cannot shift either laterally or longitudinally of the holder. Structure can be provided for clamping reel base 28 in depression 26, and in this case bolts 44 may be emitted if desired.

In FIGURE 3, it may be seen that reel seat portion 16 is provided with an axial bore 50 in which a projection 52 of handle 18 is received. In order to firmly hold projection 52 in bore 50, a retainer 54 is provided as a part of the reel seat. Retainer 54 includes a hollow screw 56 having threads 58 screwed into matching threads in reel seat portion 16. There is an opening in the inner end 60 of screw 56, and a ball 62 is provided inside the screw and is slightly larger in diameter than the opening so that part of the ball may project outside of the screw into the bore 50 as shown. A spring 64 is provided inside screw 56 and urges the ball 62 partially outside of the inner end 60 of screw 56. The projection 52 of handle 18 has an indentation 66 which ball 62 engages, and this indentation could extend all the way around extension 52. However, with ball 62 engaged in indentation 66, the handle 18 is held firmly in place with the eyelets of the rod aligned with the reel. A threaded cap 68 may be provided in screw 56 and may be removed to allow the spring 64 and ball 62 to be inserted in screw 56.

An eyelet 70 may be formed integral with the material of the reel seat portion 16, and this eyelet has an opening 72 through which a rope, line or wire, or a hook may be inserted for the purpose of anchoring the holder structure 10 to a boat. Thus, when the holder is not in use, it can easily be secured to the boat to prevent it from falling overboard in case it becomes snagged in a line or otherwise disturbed.

Handles 12 and 18, when made of metal, may be finely knurled as shown in order to provide a surface on the handles which may be gripped firmly to prevent the handles from slipping. Thus, even if the hand is wet or has fish scales on it, the rod and reel holder may be held and will not slip away. If the holder is made of aluminum, it can be anodized to make its surface corrosion resistant. Gold anodizing provides a particularly attractive surface.

Thus, the invention provides a holder structure including a handle, a gimbal butt and a reel seat which are all integral with each other so that the holder structure can be made unusually strong. A separate handle piece may be attached to the reel seat to provide a complete rod and reel holder. The rod and reel holder has several features making it advantageous as compared to conventional holders. The transversely extending lugs together with the depression in the reel seat provide an unusually firm seat for a reel. The retention device allows the separate handle to be merely snapped in place in the reel seat. The eyelet affords an easy way to anchor the rod and reel holder to a boat. The rod and reel holder may be easily molded or cast from metal or plastic, making the holder economical to manufacture.

Having thus described my invention, I claim:

1. A fishing rod and reel holder comprising an elongated, one-piece, rigid handle having a roughened exterior surface which is an integral part of said handle and which is adapted to be gripped in the manipulation of said holder when fishing, a gimbal butt integral with said handle and projecting from one end of said handle, said gimbal butt having a recess therein for engagement with a gimbal in the use of said holder, and a cylindrical, elongated reel seat portion also integral with said handle and projecting from the end of said handle opposite said gimbal butt, said reel seat portion having a depression therein extending longitudinally of said reel seat portion for receiving the base of a reel in the affixing of such reel to said holder and having concave seating surfaces projecting laterally outward from the sides of said depression and substantially coplanar with or above the bottom of said depression, the concavity of said surfaces corresponding substantially to the curvature of the frame of the reel and lying in the plane of the curvature when the reel is in place for providing a seat for the frame of the reel, and said reel seat portion further having an axial bore therein for receiving a further handle of a fishing rod, thereby providing a one-piece rod and reel holder structure which may be cast or molded entirely from metal or plastic.

2. The rod and reel holder as claimed in claim 1 in which said seating surfaces are upper surfaces adjoining prise a pair of lugs projecting transversely from opposite sides of said reel seat portion adjacent said depression for providing a seat for a portion of the reel frame, said lugs formed as one piece with the remaining material of said reel seat portion.

3. The rod and reel holder as claimed in claim 2 in which said seating surfaces are upper surfaces adjoining said depression and which are concave in the longitudinal direction of said holder to match the curvature of said reel frame and thereby provied a firm seat for a reel.

4. The rod and reel holder as claimed in claim 3 wherein said reel frame is provided with bolts, and in which said lugs have openings extending through the same from said upper surfaces of said lugs to opposed lower surfaces thereof for receving said bolts to facilitate attachment of such reel to said reel seat.

5. The rod and reel holder as claimed in claim 1 in which said reel seat portion further inclucdese retention means for holding said further handle in said bore.

6. The rod and reel holder as claimed in claim 5 in which said retention means comprises a hollow screw threadedly affixed to said reel seat portion with the interior of said screw communicating with said bore, a ball in the interior of said screw larger in diameter than the opening of said screw communicating with said bore so that said ball is retained in said screw, and a spring in said screw urigng said ball partially out of said screw so that said ball is engageable with an indentation in said further handle to retain a portion of said further handle in said bore.

7. The rod and reel holder as claimed in claim 5 in which said reel seat portion further includes an eyelet which is an integral part of said reel seat portion and allows said holder to be attached to a retainer to anchor said holder to a boat.

8. The rod and reel holder as claimed in claim 5 in which said holder includes said one-piece handle, gimbal butt and reel seat portion, in combination with said further handle, said further handle having a roughened exterior surface for gripping and a projecting portion dimentioned to fit in said bore of said reel seat portion, said further handle receiving and retaining a fishing rod.

9. The rod and reel holder as claimed in claim 8 in which said handle of said one-piece structure and said further handle are both made entirely of metal and the exterior surfaces thereof are finely knurled.

10. The rod and reel holder as claimed in claim 9 in which said projecting portion of said further handle has an indentation therein for engagement by said retention means of said reel seat portion.

References Cited

UNITED STATES PATENTS

| | | | |
|---|---|---|---|
| 1,720,982 | 7/1929 | Van Brunt. | |
| 1,991,407 | 2/1935 | Miller et al. | 43—22 |
| 2,104,495 | 1/1938 | O'Brien | 43—22 |
| 2,180,323 | 11/1939 | Maxwell | 43—23 |
| 2,498,648 | 2/1950 | Christen | 43—22 |
| 2,753,646 | 7/1956 | Colmery | 43—22 |
| 2,855,718 | 10/1958 | Stephens | 43—22 |
| 2,929,578 | 3/1960 | Hull | 43—22 X |
| 3,123,931 | 3/1964 | Stephens | 43—22 |

FOREIGN PATENTS 120,030   10/1947   Sweden.

SAMUEL KOREN, *Primary Examiner.*

J. H. CZERWONKY, *Assistant Examiner.*

U.S. Cl. X.R.

43—23

UNITED STATES PATENT OFFICE
CERTIFICATE OF CORRECTION

Patent No. 3,443,335      Dated May 13, 1969

Inventor(s) Gilbert C. Guydos

It is certified that error appears in the above-identified patent and that said Letters Patent are hereby corrected as shown below:

Column 4, lines 31 and 32 (Claim 2) the words "are upper surfaces adjoining prise" should be changed to read --of said reel seat portion comprise--

SIGNED AND
SEALED

OCT 21 1969

(SEAL)
Attest:

Edward M. Fletcher, Jr.
Attesting Officer

WILLIAM E. SCHUYLER, JR.
Commissioner of Patents